United States Patent
Samanta et al.

(10) Patent No.: US 8,691,007 B2
(45) Date of Patent: Apr. 8, 2014

(54) LOW THERMAL TRANSMISSION BUILDING MATERIAL

(71) Applicant: Georgia-Pacific Gypsum LLC, Atlanta, GA (US)

(72) Inventors: Susnata Samanta, Medford, MA (US); Hubert Francis, Lithonia, GA (US)

(73) Assignee: Georgia-Pacific Gypsum LLC, Atlanta, GA (US)

( * ) Notice: Subject to any disclaimer, the term of this patent is extended or adjusted under 35 U.S.C. 154(b) by 0 days.

(21) Appl. No.: 13/623,634

(22) Filed: Sep. 20, 2012

(65) Prior Publication Data

US 2013/0074737 A1    Mar. 28, 2013

Related U.S. Application Data

(60) Provisional application No. 61/538,660, filed on Sep. 23, 2011, provisional application No. 61/550,714, filed on Oct. 24, 2011.

(51) Int. Cl.

| | |
|---|---|
| *C04B 28/14* | (2006.01) |
| *C04B 28/16* | (2006.01) |
| *C04B 22/00* | (2006.01) |
| *C04B 11/00* | (2006.01) |
| *C04B 11/06* | (2006.01) |
| *C04B 103/42* | (2006.01) |
| *B32B 13/00* | (2006.01) |

(52) U.S. Cl.
USPC ........... 106/680; 106/772; 106/773; 106/775; 106/782; 428/304.4; 428/703

(58) Field of Classification Search
USPC ................. 106/772, 680, 773, 775, 782; 428/304.4, 703
See application file for complete search history.

(56) References Cited

U.S. PATENT DOCUMENTS

| | | | |
|---|---|---|---|
| 6,080,475 A | 6/2000 | Frank et al. | |
| 6,620,487 B1 | 9/2003 | Tonyan et al. | |
| 6,743,830 B2 | 6/2004 | Soane et al. | |
| 7,037,865 B1 | 5/2006 | Kimberly | |
| 7,217,458 B2 | 5/2007 | Liu et al. | |
| 7,543,642 B2 | 6/2009 | Reddy et al. | |
| 7,658,794 B2 | 2/2010 | Gleeson et al. | |
| 7,833,916 B2 | 11/2010 | Leeser et al. | |
| 2006/0194026 A1* | 8/2006 | Blair et al. | 428/174 |
| 2007/0193159 A1 | 8/2007 | Schattka et al. | |
| 2008/0070024 A1 | 3/2008 | Curran et al. | |
| 2009/0078162 A1 | 3/2009 | Clausi et al. | |
| 2010/0116180 A1 | 5/2010 | Roth et al. | |
| 2010/0143731 A1 | 6/2010 | DeZurik et al. | |
| 2010/0233460 A1 | 9/2010 | Pollack | |
| 2011/0052901 A1 | 3/2011 | Ahluwalia et al. | |
| 2011/0206471 A1* | 8/2011 | Doshi et al. | 408/1 R |

FOREIGN PATENT DOCUMENTS

| | | |
|---|---|---|
| KR | 20080048131 A | 6/2008 |
| WO | 2008/110818 A1 | 9/2008 |
| WO | 2010126792 | 4/2010 |
| WO | 2011124809 | 10/2011 |

OTHER PUBLICATIONS

Derwent-Acc-No: 2009-K34271, abstract of Korean Patent Specification No. KR 2008048131A (Jun. 2008).*
International Search Report and Written Opinion of the European Patent Office for PCT/US12/56356, mailed Dec. 5, 2012.

* cited by examiner

*Primary Examiner* — Anthony J Green
(74) *Attorney, Agent, or Firm* — Ram W. Sabnis

(57) ABSTRACT

A wallboard, a method of preparing a wallboard, and a method of making a gypsum slurry to prepare a wallboard are provided. The wallboard includes a set gypsum dihydrate derived substantially from a non-fibrous form of calcium sulfate and selected from the group consisting of anhydrous gypsum and gypsum hemihydrate. The wallboard also includes an aerogel dispersed in the gypsum dihydrate.

18 Claims, 2 Drawing Sheets

LOW THERMAL TRANSMISSION BUILDING MATERIAL

CROSS REFERENCE TO RELATED APPLICATIONS

This application claims priority to U.S. Provisional Patent Application No. 61/538,660 filed on Sep. 23, 2011 and to U.S. Provisional Patent Application No. 61/550,714 filed on Oct. 24, 2011, the disclosures of which are incorporated in full herein by reference.

TECHNICAL FIELD

A gypsum composition is described. More particularly, the gypsum composition comprises a low density component and may be used in wallboards to reduce thermal conductivity, decrease weight, and improve fire performance.

BACKGROUND

Various products containing the naturally-occurring mineral, gypsum, have been developed for the building trades. Especially notable are various gypsum wallboard products, e.g., sheet materials typically faced with material such as paper, non-woven glass fiber, or the like. In producing gypsum building products, calcined gypsum, i.e., anhydrous or hemihydrate ($CaSO_4 \cdot \frac{1}{2}H_2O$), known also as stucco, plaster of Paris, molding plaster, building plaster, and the like, typically in a slurry, is cast, molded, and dried. During the course of this process, the calcined gypsum is further hydrated, yielding hydrated gypsum ($CaSO_4 \cdot 2H_2O$).

Gypsum building materials generally are held in high regard for use in fire-resistant construction. The spread of fire and the penetration of flame through set gypsum structures are delayed, because impinging heat initially operates to reverse the hydration reaction, recalcining gypsum, and liberating water. The liberated water is an additional energy sink, absorbing its heat of vaporization. Although gypsum doesn't burn, it shrinks and cracks when heated in a flame.

Although conventional gypsum may be fire resistant, gypsum with greater fire resistance properties and lower thermal conductivity is desirable.

SUMMARY

In one aspect, a wallboard is provided. The wallboard includes a set gypsum dihydrate derived substantially from a non-fibrous form of calcium sulfate. The calcium sulfate is selected from the group consisting of anhydrous gypsum and gypsum hemihydrate. The wallboard further includes an aerogel dispersed in the set gypsum hydrate.

In another aspect, a method of preparing a wallboard is provided. The method includes forming a slurry composition. The slurry composition includes a gypsum dihydrate derived substantially from a non-fibrous form of calcium sulfate and selected from the group consisting of anhydrous gypsum and gypsum hemihydrate. The slurry composition also includes an aerogel dispersed in the gypsum dihydrate. The slurry is applied to a lower facing material to form a core layer and an upper facing material is applied to an upper surface of the core layer. The core layer and the upper and lower facing materials are sufficiently heated to dry the core layer and to dry the upper and lower facing materials, thus forming the wallboard.

In yet another aspect, a method of making a gypsum slurry is provided. The method includes mixing water, a non-fibrous form of calcium sulfate selected from the group consisting of anhydrous gypsum and gypsum hemihydrate, and an aerogel to form the gypsum slurry.

Additional aspects will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

These and other features, aspects, and advantages of the present invention will become better understood when the following detailed description is read with reference to the accompanying drawings, wherein.

DETAILED DESCRIPTION

Figure 1:
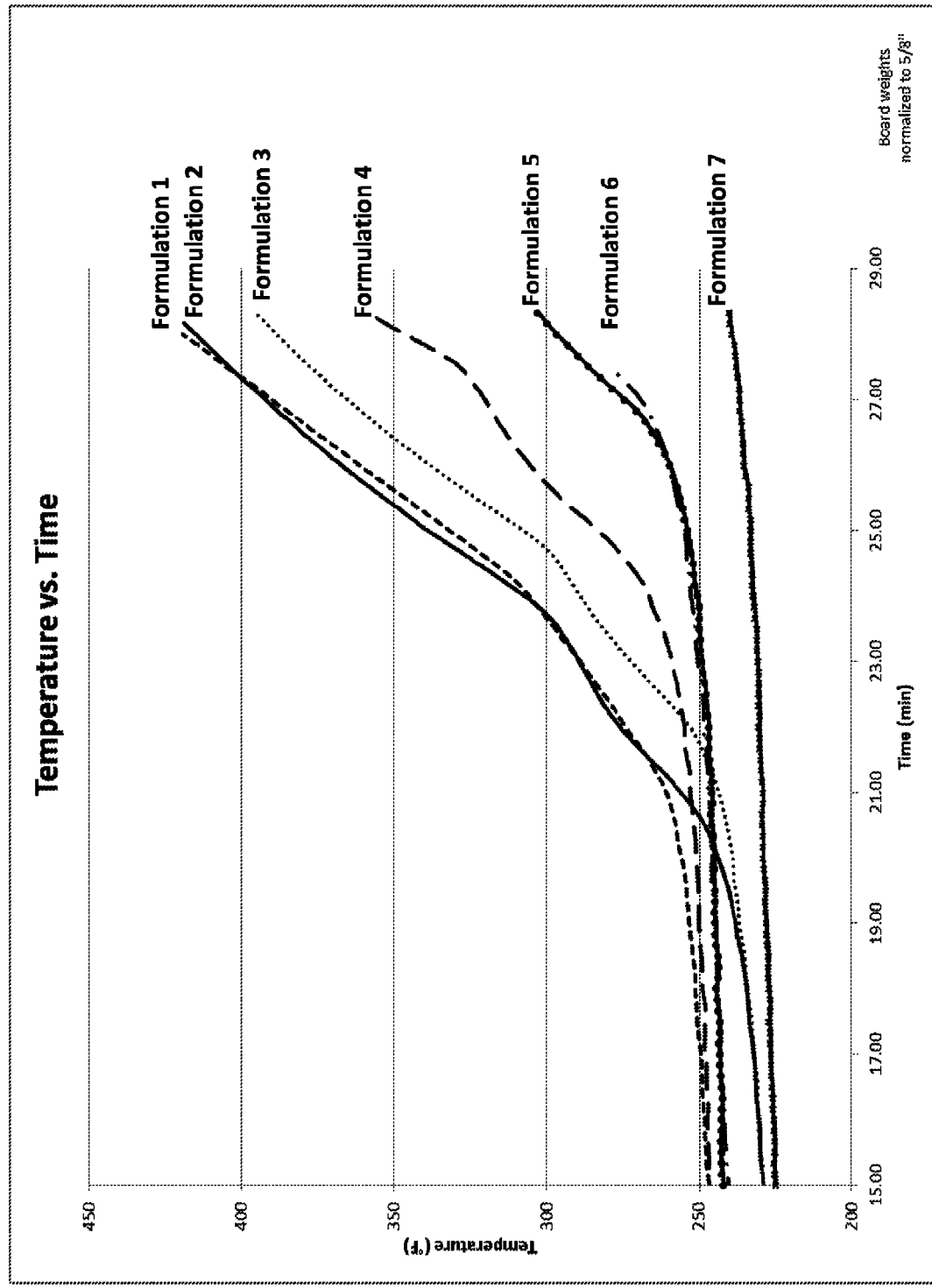
FIG. 1 is a graph of temperature (° F.) vs. time (min.), as measured from the non-exposed sides of gypsum wallboards exposed to a muffle furnace, in accordance with embodiments of the present disclosure.

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment," "an embodiment," or "embodiments" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "parts" is used to define quantitative amounts. The term is intended to define parts by weight unless indicated to the contrary. The term "(w/w)" means weight percent.

Gypsum Compositions

An essential constituent comprising the products of the present disclosure is calcium sulfate dihydrate. This constituent is derived from the hydration of any form of calcium sulfate which is in non-fibrous form and which is capable of reacting with water for form set gypsum, that is, calcium sulfate dihydrate. Thus, the calcium sulfate may be in anhydrous form or in the hemihydrate form. The hemihydrate may be produced from the naturally-occurring gypsum material by heating, or calcining, the dihydrate. As used herein, the hemihydrate form of gypsum may be referred to as "stucco."

Another essential constituent comprising the products of the present disclosure is water. Water is added to the process to hydrate the stucco and to provide fluidity. Water may be added to form the calcium sulfate dihydrate in amounts in the range of about 30 parts per 100 parts of stucco to about 90 parts per 100 parts of stucco.

In some embodiments of the present disclosure, a gypsum composition is provided. The gypsum composition may comprise a gypsum dihydrate derived substantially from a non-fibrous form of calcium sulfate selected from the group consisting of anhydrous gypsum and gypsum hemihydrate (i.e., stucco). The gypsum composition may further comprise an aerogel dispersed in the gypsum dihydrate.

Aerogels describe a class of material based upon their structure, namely low density, open cell structures, large surface areas, and nanometer scale pore sizes. For instance, low density aerogels based on silica are excellent insulators, with thermal conductivities of about 14 mW/m-K and below at 100° F. and at atmospheric pressure. Aerogels function as thermal insulators primarily by minimizing conduction, convection, and radiation.

In some embodiments, the aerogel may be dispersed substantially throughout the gypsum dihydrate. In other embodiments, the aerogel may be dispersed homogenously in the gypsum dihydrate.

In some embodiments, the aerogel may comprise a carbon aerogel. In some embodiments, the carbon aerogel may comprise, for instance, a cured phenolic aerogel, a cured resorcinol formaldehyde aerogel, and the like. In some embodiments, the carbon aerogel is characterized as having a particle size in the range from about 5 microns to about 4000 microns, from about 5 microns to about 1200 microns, from about 5 microns to about 500 microns, from about 5 microns to about 15 micron, or from about 5 microns to about 10 microns.

In some embodiments, the aerogel may comprise a silica aerogel. In some embodiments, the silica aerogel may comprise a Cryogel™ and/or Pyrogel™ material (Pacor, Inc., Cinnaminson, N.J.). In some embodiments, the silica aerogel is characterized as having a particle size in the range from about 5 microns to about 4000 microns, from about 5 microns to about 1200 microns, from about 5 microns to about 500 microns, from about 5 microns to about 15 microns, or from about 5 microns to about 10 microns.

In embodiments, the aerogel may be present in the gypsum composition in an amount from about 0.1% to about 25% (w/w), about 0.1% to about 20% (w/w), about 0.1% to about 15% (w/w), about 0.1% to about 10% (w/w), about 0.1% to about 5% (w/w), about 0.5% to about 4% (w/w), about 0.5% to about 3% (w/w), about 0.5% to about 2% (w/w), about 0.5% to about 1% (w/w), or about 0.1% to about 0.5% (w/w) of the gypsum composition.

In still other embodiments, the gypsum composition may further comprise a surfactant. The surfactant may be an ionic surfactant or a non-ionic surfactant. In some embodiments, the surfactant may be Hyonic® PFM 10, PFM 15, and/or PFM 33 (Geo Specialty Chemical, Lafayette, Ind.). In embodiments, the surfactant may be present in the gypsum composition in an amount from about 0.1% to about 2% (w/w), 0.1% to about 1% (w/w), or about 0.1% to about 0.5% (w/w) of the gypsum composition.

While clay is naturally found in stucco, it may also be added to gypsum compositions. For instance, clays may be added to improve the flame retardancy of gypsum products. Suitable clay includes smectite, bentonite, illite, kaolinite, vermiculite, montmorillonite, hectorite, and the like, and mixtures thereof. In some embodiments, clay may be present in an amount within the range of about 0.01 wt % to about 10 wt %, from about 0.05 wt % to about 5 wt %, or from about 0.1 wt % to about 2.0 wt % of the gypsum composition.

In some embodiments, a method of making a gypsum composition is provided. The method comprises mixing water, a non-fibrous form of calcium sulfate selected from the group consisting of anhydrous gypsum and gypsum hemihydrate, and an aerogel to form a slurry. In some embodiments, the aerogel may be dispersed substantially throughout the slurry. In other embodiments, the aerogel may be dispersed homogeneously in the slurry.

In some embodiments, the method of making the gypsum composition comprises dry blending the calcium sulfate with the aerogel before the addition of water to form the slurry. In some embodiments, the step of dry blending the calcium sulfate with the aerogel may further comprise the use of a surfactant to facilitate the coating of the calcium sulfate onto the aerogel particles.

Water is used in the preparation of the slurry. Water may be obtained from a variety of sources including but not limited to tap water, distilled water, purified water, rain water, and the like. In some embodiments, the weight ratio of water to calcium sulfate that is used to prepare the slurry in the in range of about 0.5 to about 4.0, about 0.5 to about 3.0, about 0.5 to about 2.0, about 0.5 to about 1.5, about 0.5 to about 1.2, or about 0.5 to about 1.0.

In some embodiments, the method of making the gypsum composition may further comprise casting a product from the slurry, heating the product, and then drying the product. In some embodiments, the product may be a wallboard.

In some embodiments, the aerogel used in the method of making the gypsum composition may comprise a silica aerogel. In some embodiments, the wallboard formed from the method of making the gypsum composition may be characterized as having a weight of less than about 3800 pounds per msf, less than about 2100 pounds per msf, or less than about 1800 pounds per msf. As used herein, the term "msf" means 1000 square feet.

Additionally, the gypsum composition, made according to the disclosed methods of making the gypsum composition, may include any of the parameters listed above for the gypsum compositions.

Gypsum Wallboards

The gypsum compositions described above may be incorporated into gypsum wallboards. In some embodiments, a wallboard is provided. The wallboard comprises a set gypsum dihydrate derived from substantially a non-fibrous form of calcium sulfate selected from the group consisting of anhydrous gypsum and gypsum hemihydrate. The wallboard further comprises an aerogel dispersed in the set gypsum dihydrate core.

In some embodiments, the aerogel may be dispersed substantially throughout the set gypsum dihydrate. In other embodiments, the aerogel may be dispersed homogenously in the set gypsum dihydrate.

In some embodiments, the aerogel may comprise a carbon aerogel. In some embodiments, the carbon aerogel may comprise, for instance, a cured phenolic aerogel, a cured resorcinol formaldehyde aerogel, and the like. In some embodiments, the carbon aerogel is characterized as having a particle size in the range from about 5 microns to about 4000 microns, from about 5 microns to about 1200 microns, from about 5 microns to about 500 microns, from about 5 microns to about 15 microns, or from about 5 microns to about 10 microns.

In some embodiments, the aerogel may comprise a silica aerogel. In some embodiments, the silica aerogel may comprise a Cryogel™ and/or Pyrogel™ material (Pacor, Inc., Cinnaminson, N.J.). In some embodiments, the silica aerogel is characterized as having a particle size in the range from about 5 microns to about 4000 microns, from about 5 microns to about 1200 microns, from about 5 microns to about 500 microns, from about 5 microns to about 15 microns, or from about 5 microns to about 10 microns.

In embodiments, the aerogel may be present in the gypsum composition in an amount from about 0.1% to about 25% (w/w), about 0.1% to about 20% (w/w), about 0.1% to about 15% (w/w), about 0.1% to about 10% (w/w), about 0.1% to about 5% (w/w), about 0.5% to about 4% (w/w), about 0.5% to about 3% (w/w), about 0.5% to about 2% (w/w), about 0.5% to about 1% (w/w), or about 0.1% to about 0.5% (w/w) of the gypsum composition.

In still other embodiments, the set gypsum dihydrate may further comprise a surfactant. The surfactant may be an ionic surfactant or a non-ionic surfactant. In some embodiments, the surfactant may be Hyonic® PFM 10, PFM 15, and/or PFM 33 (Geo Specialty Chemical, Lafayette, Ind.). In embodiments, the surfactant may be present in the gypsum composition in an amount from about 0.1% to about 2% (w/w), 0.1% to about 1% (w/w), or about 0.1% to about 0.5% (w/w) of the set gypsum dihydrate.

While clay is naturally found in stucco, it may also be added to the set gypsum dihydrate. For instance, clays may be added to improve the flame retardancy of gypsum products. Suitable clay includes smectite, bentonite, illite, kaolinite, vermiculite, montmorillonite, hectorite, and the like, and mixtures thereof. In some embodiments, clay is present in an amount within the range of about 0.01 wt % to about 10 wt %, from about 0.05 wt % to about 5 wt %, or from about 0.1 wt % to about 2.0 wt % of the set gypsum dihydrate.

Also considered as falling within the scope of the present disclosure are the presence of any of the following additives which are commonly used in the manufacture of gypsum based building materials: polymeric binders, dispersants, set retarders, set accelerators, foaming agents, defoamers, biocides, paper fibers, particulate fillers and aggregates, water reducers and dispersants, starch and facing papers, and fire resistance additives.

Exemplary polymeric binders include acrylic latexes and other vinyl homopolymers and copolymers, including polyvinyl acetate and a copolymer of vinyl acetate with another vinyl monomer such as ethylene.

Set accelerators may enhance the setting reaction of the gypsum compositions. Suitable accelerators include, for example, potassium sulfate, finely ground gypsum, $CaCl_2$, $Na_2CO_3$, NaOH, CaO, $Ca(OH)_2$, and the like. Set accelerators may be present in the gypsum core in an amount from about 0.0001 wt % to about 1 wt % based on the stucco weight of the composition.

Set retarders may be used to slightly delay the setting reactions until after the stucco/water slurry has been formed into a sheet. Suitable retarders may include, for example, sodium citrate, sodium phosphate, proteins, and the like. Another class of set retarders that may be used comprises divalent or trivalent metal compounds, including but not limited to magnesium oxide, zinc oxide, calcium carbonate, magnesium carbonate, zinc sulfate, zinc stearate, and combinations thereof. Set retarders may be present in the gypsum core in an amount from about 0.0001 wt % to about 0.001 wt % or from about 0.0005 wt % to about 0.0008 wt % based on the stucco weight of the composition.

Exemplary foaming agents may include various soaps. The foaming agents, when present, may be used in an amount from about 0.0001 wt % to about 1 wt % based on the stucco weight in the composition.

Biocides, i.e. for mold and mildew resistance, may also be present in amounts known to be effective. Exemplary biocides include zinc thiocarbamates and the like. The biocide, when present, may be used in an amount from about 0.0001 wt % to 1 wt % based on the stucco weight in the composition.

Various fillers may also be present, such as cenospheres (hollow ceramic microspheres), diatomite, wollastonite, ground rice hulls, ground perlite, chopped glass fibers, or the like. These and other fillers may be used to provide additional benefits. For example, calcium carbonates or alumina hydrates may improve sandability and flexibility. The acoustic/thermal insulation properties may be improved by adding rubber particles, vermiculite, perlite, and shredded or expanded polystyrene. Fly ash, colloidal silica, fumed silica, and colloidal alumina may also be used. Fly ash is defined as solid powders having a chemical composition similar to or the same as the composition of material that is produced during combustion of powdered coal, i.e., 25 wt % to 60 wt % silica, 10 wt % to 30 wt % aluminum oxide, 5 wt % to 25 wt % iron oxide, 0 wt % to 20 wt % calcium oxide, and 0 wt % to 5 wt % magnesium oxide. Filler, when present, may be used in an amount from about 1 wt % to about 30 wt %, about 5 wt % to about 30 wt %, about 10 wt % to about 25 wt %, or about 15 to about 20 wt % based on the weight of the stucco in the composition.

Water reducers may also be used and may also be referred to as dispersants. As used herein, the term "water reducer" means a substance which is generally used in gypsum to improve the flow properties so that the gypsum slurries may be pumped or effectively poured. The water reducers, also commonly referred to as superplasticizers, may be used to make gypsum compositions with reduced water content which still retain adequate flow properties. Examples of suitable water reducers for use in this disclosure include, for example, lignosulfonates, sodium naphthalene sulfonate formaldehyde condensates, napthalene sulfonate, polycarboxylates, and the like. The dispersant, when present, may be used in an amount of about 0.0001 wt % to about 1.0 wt %, about 0.1 wt % to about 0.7 wt %, or about 0.1 wt % to about 0.4 wt % based on the stucco weight of the composition.

Defoamers may be added to board edges to create denser strong regions for handling.

Exemplary fire resistance additives include but are not limited to perlite, vermiculite, and boric acid. Additional fire retardants may include mineral oxides, mineral hydroxides, clays, metal oxides, metal hydroxides, and metal carbonates such as magnesite. The fire retardant, when present, may be in an amount from about 5 wt % to about 30 wt %, about 10 wt % to about 25 wt %, or about 15 wt % to about 20 wt % based on the total weight of the stucco in the composition.

Wallboards for interior use may contain wax or a wax emulsion as an additive to improve water resistance of the gypsum core. The disclosure is not limited thereby, however, and examples of other materials which have been reported as being effective for improving the water-resistant properties of gypsum products include the following: poly(vinyl alcohol), with or without a minor amount of poly(vinyl acetate); metallic resinates; wax or asphalt or mixtures thereof, sometimes as an emulsion; a mixture of wax and/or asphalt and also cornflower and potassium permanganate; water insoluble thermoplastics such as petroleum and natural asphalt, coal tar, and thermoplastic synthetic resins such as poly(vinyl acetate), poly(vinyl chloride), and a copolymer of vinyl acetate and vinyl chloride and acrylic resins; a mixture of metal rosin soap, a water soluble alkaline earth metal salt, and residual fuel oil; a mixture of petroleum wax in the form of an emulsion and either residual fuel oil, pine tar or coal tar; a mixture comprising residual fuel oil and rosin; aromatic isocyanates and diisocyanates; organohydorgenpolysiloxanes; siliconates; a wax emulsion and a wax-asphalt emulsion each with or without such materials as potassium sulfate, alkali and alkaline earth aluminates, and Portland cement; a wax-asphalt emulsion prepared by adding to a blend of molten wax and asphalt an oil-soluble, water dispersing emulsifying agent, and admixing the aforementioned solution of casein which contains, as a dispersing agent, an alkali sulfonate of a polyarylmethylene condensation product. Mixtures of these additives may also be used.

Species of wax emulsions and wax-asphalt emulsions used to improve wallboard water resistance are commercially available. The wax portion of these emulsions may preferably be a paraffin or microcrystalline wax, but other waxes may also be used. The total amount of wax and wax-asphalt in the aqueous emulsions may generally comprise about 50 wt % to about 60 wt % of the aqueous emulsion. In the case of wax-asphalt emulsions, the weight ratio of asphalt to wax may vary from about 1 to about 1 or from about 10 to about 1. The amount of wax emulsion used to provide water resistant characteristics to the gypsum core may be within the range of about 3 wt % to about 10 wt % or about 5 wt % to about 7 wt %, based on the total weight of the ingredients of the composition from which the set gypsum core is made, the ingredients including the water of the wax or wax-asphalt emulsion, but not including additional amounts of water that are added to the gypsum composition for forming an aqueous slurry thereof.

As used herein, the term "facing material" may comprise facing papers, non-woven glass fibers, and other suitable materials for forming a layer over a gypsum core.

When the end product to be manufactured is wallboard, facing papers, or other facing materials such as non-woven glass fibers may be used to cover the two exterior faces of the gypsum slurry or core. In practice, specially selected paper is used to confer the appropriate appearance and strength to the wallboard. A starch binder for adhering the facing paper to the gypsum slurry may also be used.

In some embodiments, an additive may be used to promote the adhesion between the set gypsum core and the adjacent facing material(s). In some embodiments, starch may be used to promote adhesion. In still other embodiments, polyvinyl alcohol may be used as a binder.

The paper backing used in making the gypsum wallboard may be made up of any type of thick paper or paperboard material such as, for example, unbleached Kraft paperboard, recycled paperboard, semichemical paperboard, or solid bleached paperboard. Typically, this thick paper or paperboard may have a thickness of about 0.010 inches (10 mils), about 0.012 inches (12 mils), about 0.014 inches (14 mils), about 0.016 inches (16 mils), or about 0.020 inches (20 mils). The use of multi-ply paper may also be possible. Multi-ply paper used for the facing sheet of gypsum board products typically has a basis weight from about 50 pounds per 1000 square feet to about 60 pounds per 1000 square feet, an overall caliper of about 250 microns to about 350 microns, and a Gurley porosity from about 15 seconds to about 145 seconds. Often, different types of paper are used for each gypsum board surface. For example, manila paper is frequently used on one side, while newsliner is used on the opposite side. Paper and cardboard facing materials are normally made from recycled fibers (e.g., used corrugated paper, kraft cuttings, or waste newsprint), but they also may be partially or wholly made from virgin fibers. Other natural or synthetic fibrous materials may be used, including those derived from metals or glass (e.g., fiberglass mat, chopped or continuous strand mat, or glass roving, both woven and non-woven). Other useful materials for the facing sheets include filament forming synthetic organic polymers (e.g., nylon, polyesters, polypropylene, polyethylene, rayon, and cellulosics), ceramics, cotton, cloth, hair, felt, and the like. Multiple layers of fibrous materials, for a composite sheet of a glass mat and kraft paper, may also be used.

When a fibrous mat is used for either or both facing materials, the mat preferably is coated to make it resistant to moisture. Such a coating should be sufficiently porous, however, to permit water in the aqueous gypsum slurry from which the gypsum core is made to evaporate during manufacture of the board. Fibrous mats should also contain material that is capable of forming a strong bond with the set gypsum comprising the core of the gypsum board.

Examples of such fibrous materials include (1) a mineral-type material such as glass fibers; (2) synthetic resin fibers; and (3) mixtures of such fibers. The mat may comprise continuous or discrete strands or fibers may be woven or nonwoven in form. Nonwoven mats such as made from chopped strands and continuous strands may be used. The strands of such mats typically are bonded together to form a unitary structure by a suitable adhesive. The fiber mat can range in thickness, from about 10 mils to about 40 mils, about 15 mils to about 35 mils, or from about 20 mils to about 30 mils.

The fibrous mats may be a pre-coated glass fiber mat, wherein the outer surface of the mat is coated with a coating that comprises a mixture of predominantly a mineral pigment, an inorganic binder, and a latex polymer binder.

A mineral pigment may be a component of the coating composition. Examples of mineral pigments suitable for making the coated mats include, but are not limited to, ground limestone, clay, sand, mica, talc, gypsum, aluminum trihydrate, antimony oxide, or a combination of two or more of these substances.

The inorganic binder may be an inorganic compound such as calcium oxide, calcium silicate, calcium sulfate, magnesium oxychloride, magnesium oxysulfate, or aluminum hydroxide. Alternatively, the inorganic binder may be an inherent component in the mineral pigment component, as in the case wherein the mineral pigment includes aluminum trihydrate, calcium carbonate, calcium sulfate, magnesium oxide, or some clays and sands.

In some embodiments, a method of preparing a wallboard is also provided. The method comprises forming a slurry comprising a gypsum dihydrate derived substantially from a non-fibrous form of calcium sulfate selected from the group consisting of anhydrous gypsum and gypsum hemihydrate. The slurry further comprises an aerogel that is dispersed in the gypsum dihydrate. The slurry is mixed and is then applied to a lower facing material to form a core layer. An upper facing material is then applied to an upper face of the core layer, and the core layer and the upper and lower facing materials are heated sufficiently to dry the core layer and the upper and lower facing materials to form the wallboard. The method of preparing a wallboard may also include the use of any of the additional components described above for wallboards. Additionally, the method of preparing a wallboard may also incorporate any of the above-listed parameters for gypsum cores of wallboards, including but not limited to the use of aerogels and/or surfactants.

As used herein, the term "core layer" means a layer of slurry that has been or will be sandwiched between an upper and a lower facing material.

In an exemplary continuous manufacturing process, two reels of facing material are simultaneously unwound. One reel of a lower facing material unwinds below the mixer that forms the slurry, such that the slurry is applied to this material. An upper facing material from a second reel is then brought into contact with the slurry from above, thereby sandwiching the slurry. The "sandwich" of slurry and adjacent facing materials is then passed through a mold or other forming device for establishing the thickness of the gypsum board. The slurry is then allowed to set and form the gypsum core by hydration of the stucco. During this setting process, the core hardens as the gypsum mineral (calcium sulfate dihydrate) is formed.

In another embodiment, a relatively thin layer of slurry comprising stucco and an aerogel may be applied to the first side of the lower face and/or the first side of the upper face. These thin layers of slurry may be made to have a higher density by reducing the water to stucco ratio or by eliminating the foam component from a slurry. In an exemplary continuous manufacturing process, two reels of facing material are simultaneously unwound. A relatively thin layer of slurry comprising stucco and an aerogel is applied to the first side of a lower facing material as it unwinds ahead of the mixer. The lower face which contains a relatively thin layer of slurry continues below the mixer that forms the slurry, such that another slurry which does not contain an aerogel or contains a reduced amount of an aerogel is applied onto this thin layer. An additional thin layer of slurry comprising stucco and an aerogel can then be applied to the first side of the upper facing material from a second reel. The upper face which contains a relatively thin layer of slurry is then brought into contact with the slurry from above, thereby sandwiching the slurry. The "sandwich" of slurry and adjacent facing materials containing a thin layer of slurry is then passed through a mold or other forming device for establishing the thickness of the wallboard. The slurry is then allowed to set and form the gypsum core by hydration of the stucco. During this setting process, the core hardens as the gypsum material (calcium sulfate dihydrate) is formed.

In another embodiment, a relatively thin layer of slurry comprising stucco and an aerogel may be applied to the first side of the lower face and/or the first side of the upper face. These thin layers of slurry may be made to have a higher density by reducing the water to stucco ratio. In an exemplary continuous manufacturing process, two reels of facing material are simultaneously unwound. A relatively thin layer of slurry comprising stucco and an aerogel is applied to the first side of a lower facing material as it unwinds ahead of the mixer. The lower face which contains a relatively thin layer of slurry continues below the mixer that forms the slurry, such that another slurry which comprises stucco and an aerogel is applied onto this thin layer. An additional thin layer of slurry comprising stucco and an aerogel can then be applied to the first side of the upper facing material from a second reel. The upper face which contains a relatively thin layer of slurry is then brought into contact with the slurry from above, thereby sandwiching the slurry. The "sandwich" of slurry and adjacent facing materials containing a thin layer of slurry is then pass through a mold or other forming device for establishing the thickness of the wallboard. The slurry is then allowed to set and form the gypsum core by hydration of the stucco. During this setting process, the core hardens as the gypsum material (calcium sulfate dihydrate) is formed.

As used herein, the term "slate coat" refers to the relatively thin layer of slurry comprising stucco and an aerogel and further having a higher density as compared with the density of the remainder of the slurry that forms the gypsum core. As described above, one or more slate coats may be applied to a gypsum core. In some embodiments, the slate coats may be applied to opposite sides or faces of the gypsum core. In still other embodiments, one or more slate coats may be applied to a single side or face of a gypsum core. In still other embodiments, one or more slate coats may be applied to each opposite side or face of the gypsum core.

The slurry generally contains more water than necessary solely to reconstitute the gypsum from the stucco. This extra water is used in the board forming stage to reduce the stucco slurry viscosity sufficiently to allow for its even distribution (e.g., by using a forming roll) across and between the facing sheets at a desired thickness. As a result of the used of excess water, the gypsum board remains wet after hydration. Therefore, the formed board is usually dried.

The drying operation typically involves applying heat by circulating hot air (e.g., a drying oven) around the wet gypsum board to evaporate the excess water. It is necessary, therefore, that the facing sheet materials be sufficiently porous to allow this excess water to readily evaporate without adverse effects such as delamination, tearing, bursting, etc. of the facing sheet materials. The ability of the facing sheet materials to easily allow the escape of water vapor also promotes a uniform degree of dryness. This improves overall board quality, since insufficiently dried gypsum board presents storage problems, while overdrying leads to calcination and causes loss of mechanical strength. Typical drying conditions involve maintaining an ambient or surrounding hot air temperature from about 200° F. to about 600° F. or from about 250° F. to about 500° F., for a drying time from about 10 minutes to about 2 hours, from about 30 minutes to 1 hour, or from about 30 minutes to 45 minutes, and with a line speed from about 70 feet/minute to about 250 feet/minute or from about 100 feet/minute to about 200 feet/minute.

EXAMPLES

Gypsum Compositions

Gypsum compositions comprising silica aerogels were prepared with the formulations as defined in Table I. All of the formulations were prepared using stucco (calcium sulfate hemihydrate; $CaSO_4 \cdot \frac{1}{2}H_2O$). A control gypsum composition (Formulation 1) did not contain silica aerogels. The stucco was obtained from Georgia Pacific LLC (Atlanta, Ga.). The silica aerogels were obtained from Cabot Corporation (Boston, Mass.).

TABLE I

| Formulation No. | Water/Stucco Ratio | Aerogel Amount (wt %) | Aerogel Particle Size (micron) |
| --- | --- | --- | --- |
| 1 | 1.2 | 0% | — |
| 2 | 1.5 | 2% | 0-700 |
| 3 | 1.5 | 2% | 8 |
| 4 | 1.5 | 2% | 1.2-4 |
| 5 | 0.6 | 0.5% | 0-700 |
| 6 | 1.5 | 2% | 0-700 |
| 7 | 0.6 | 2% | 8 |

Wallboard Preparation

To prepare the gypsum compositions, commercially available aerogels were dry blended with stucco according to one of two methods.

Method One. An appropriate amount of stucco and an appropriate amount of aerogel were dry blended in a Hobert mixer (KitchenAid®, St. Joseph, Mich.) until a significant amount of the aerogel component was observed to be physically coated on the stucco particles.

Method Two. An appropriate amount of stucco and an appropriate amount of aerogel were combined with 0.1 wt %-0.5 wt % of a surfactant (Hyonic® PFM 15; Geo Specialty Chemical, Lafayette, Ind.). The combination was then dry blended in a Hobert mixer until a significant amount of the aerogel component was observed to be physically coated on the stucco particles.

Aerogel blended stucco, obtained from either method one or method two, was mixed with water at different water to stucco ratios (see Table I). After two minutes of stirring, the water stucco slurry was poured into a 4 inch×4 inch mold having a 0.5 inch thickness. The samples were removed from the mold after 30 minutes, permitted to cool to ambient temperature, and then dried in an oven at 110° F. until no further weight loss was observed. The samples were then cooled to ambient temperature under controlled humidity conditions.

Thermal Transmission Testing

Figure 2:
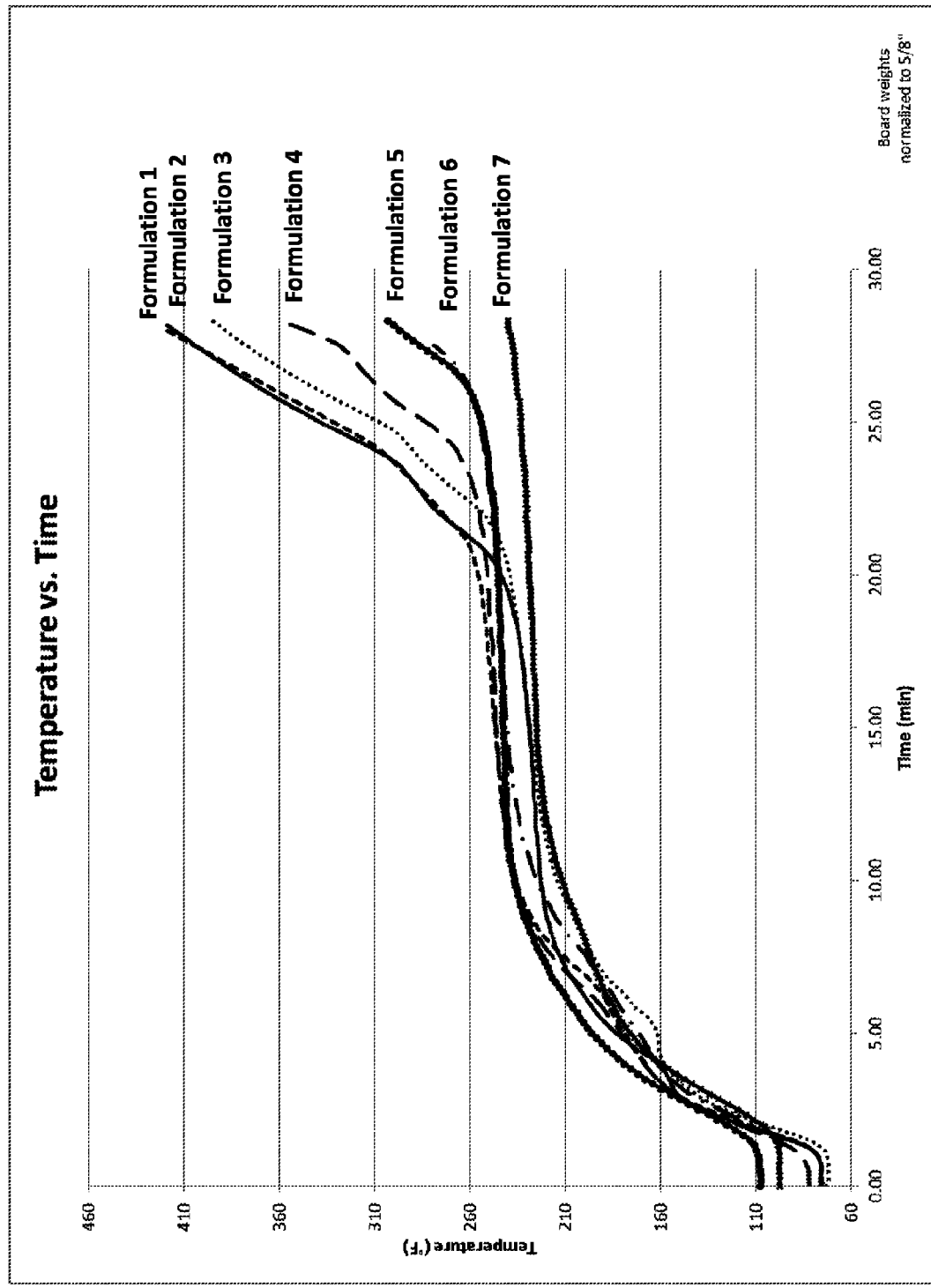
FIG. 2 is another graph of temperature (° F.) vs. time (min.), as measured from the non-exposed sides of gypsum wallboards exposed to a muffle furnace, in accordance with embodiments of the present disclosure.

Each sample was subsequently tested for fire performance using a muffle furnace test. The samples were each placed directly facing the muffle furnace, completely covering the opening of the muffle furnace heating chamber. One surface of each sample was exposed to a temperature of 1000° F. and the thermal transmission of the sample was evaluated by measuring the change in temperature on the other (non-exposed) side of the sample using a thermocouple. The temperature change as a function of time was then plotted for each sample. The complete data is presented in FIGS. 1-2 and summarized in Table II.

TABLE II

| Formulation No. | Dry Sample Weight (lbs./msf) | Temp. at 25 min. (° F.) |
|---|---|---|
| 1 | 2100 | 339.1 |
| 2 | 1700 | 331.9 |
| 3 | 1630 | 307.8 |
| 4 | 1630 | 283.3 |
| 5 | 3750 | 253.9 |
| 6 | 1800 | 254.9 |
| 7 | 3750 | 233.1 |

As can be seen from the data in TABLE II, the inclusion of silica aerogels into the core of gypsum wallboards significantly reduced the thermal transmission through the gypsum wallboard. Additionally, it should be noted that gypsum wallboards that were considerably lighter than the control gypsum wallboard were also able to provide a reduced thermal transmission.

The data was normalized as follows: Four inch by four inch wallboard samples with a one-half inch thickness were prepared. The weight of each wallboard sample was measured. Using this measurement, a calculated weight for each wallboard sample was obtained with a thickness of 0.625 inches and the same square dimensions. From this, the 1000 square foot (MSF) board weight was calculated, as presented in TABLE II.

It should be apparent that the foregoing relates only to the preferred embodiments of the present invention and that numerous changes and modifications may be made herein without departing from the spirit and the scope of the invention as defined by the following claims and equivalents thereof.

The invention claimed is:

1. A wallboard comprising:
 a set gypsum dihydrate, the set gypsum dihydrate derived substantially from a non-fibrous form of calcium sulfate selected from the group consisting of anhydrous gypsum and gypsum hemihydrate; and
 an aerogel dispersed in the set gypsum dihydrate;
 wherein the wallboard is characterized as having a weight of less than about 2100 pounds per msf and wherein the wallboard further comprises at least one slate coat.

2. The wallboard of claim 1, wherein the aerogel comprises a carbon aerogel or a silica aerogel.

3. The wallboard of claim 1, wherein the aerogel is characterized as having a particle size in the range from about 5 microns to about 4000 microns.

4. The wallboard of claim 1, wherein the aerogel is present in the wallboard in an amount from about 0.5% to about 4% (w/w) of the set gypsum dihydrate.

5. The wallboard of claim 1, further comprising a surfactant, wherein the surfactant is present in the wallboard in an amount from about 0.1% to about 1% (w/w) of the gypsum dihydrate.

6. The wallboard of claim 1, wherein the aerogel is present in the wallboard in an amount from about 0.5% to about 2% (w/w) of the set gypsum dihydrate.

7. The wallboard of claim 1, wherein the wallboard is characterized as having a weight of less than about 1800 pounds per msf.

8. The wallboard of claim 7, wherein the aerogel is present in the wallboard in an amount of about 0.5 wt % of the set gypsum dihydrate.

9. The wallboard of claim 8, wherein the aerogel is characterized as having a particle size in the range of up to about 700 microns.

10. A wallboard comprising:
 a set gypsum dihydrate, the set gypsum dihydrate derived substantially from a non-fibrous form of calcium sulfate selected from the group consisting of anhydrous gypsum and gypsum hemihydrate; and
 an aerogel dispersed in the set gypsum dihydrate, wherein the aerogel is characterized as having a particle size in the range from about 5 microns to about 4000 microns;
 wherein the aerogel is present in the wallboard in an amount from about 0.5% to about 2% (w/w) of the set gypsum dihydrate.

11. The wallboard of claim 10, wherein the wallboard is characterized as having a weight of less than about 2100 pounds per msf.

12. A wallboard comprising:
 a set gypsum dihydrate, the set gypsum dihydrate derived substantially from a non-fibrous form of calcium sulfate selected from the group consisting of anhydrous gypsum and gypsum hemihydrate;
 an aerogel dispersed in the set gypsum dihydrate; and
 at least one slate coat on a surface of the set gypsum dihydrate.

13. The wallboard of claim 12, wherein the aerogel is present in the wallboard in an amount from about 0.5% to about 2% (w/w) of the set gypsum dihydrate.

14. The wallboard of claim 12, wherein the aerogel is characterized as having a particle size in the range from about 5 microns to about 4000 microns.

15. The wallboard of claim 12, wherein the wallboard is characterized as having a weight of less than about 2100 pounds per msf.

16. The wallboard of claim 12, wherein the wallboard is characterized as having a weight of less than about 1800 pounds per msf.

17. The wallboard of claim 12, wherein the aerogel is present in the wallboard in an amount of about 0.5 wt % of the set gypsum dihydrate.

18. The wallboard of claim 12, wherein the aerogel is characterized as having a particle size in the range of up to about 700 microns.

* * * * *